(12) United States Patent
Ackerman et al.

(10) Patent No.: US 9,481,157 B2
(45) Date of Patent: Nov. 1, 2016

(54) REPAIR APPARATUS AND METHOD FOR COMPOSITE PANELS HAVING A CONDUCTIVE LAYER

(71) Applicant: The Boeing Company, Seal Beach, CA (US)

(72) Inventors: Patrice K Ackerman, Kent, WA (US); Weston K Anderson, Federal Way, WA (US); Russell J Heeter, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 134 days.

(21) Appl. No.: 14/199,615

(22) Filed: Mar. 6, 2014

(65) Prior Publication Data

US 2015/0251401 A1 Sep. 10, 2015

(51) Int. Cl.
| | | |
|---|---|---|
| *B32B 37/12* | (2006.01) | |
| *B32B 37/18* | (2006.01) | |
| *B32B 37/00* | (2006.01) | |
| *B32B 38/00* | (2006.01) | |
| *B29C 73/10* | (2006.01) | |
| *B64D 45/02* | (2006.01) | |

(Continued)

(52) U.S. Cl.
CPC ............. *B32B 37/18* (2013.01); *B29C 73/10* (2013.01); *B32B 37/0046* (2013.01); *B32B 37/12* (2013.01); *B32B 38/0012* (2013.01); *B64D 45/02* (2013.01); *B64F 5/0081* (2013.01); *B29L 2031/3076* (2013.01); *B32B 2037/1246* (2013.01); *B32B 2038/0016* (2013.01); *B32B 2305/22* (2013.01); *B32B 2307/202* (2013.01); *B32B 2307/204* (2013.01); *B32B 2313/04* (2013.01); *B32B 2605/18* (2013.01)

(58) Field of Classification Search
CPC .... B32B 37/12; B32B 38/0012; B29C 73/10
USPC ..................................... 156/98, 94
See application file for complete search history.

(56) References Cited

U.S. PATENT DOCUMENTS

| | | | | |
|---|---|---|---|---|
| 4,912,594 A | * | 3/1990 | Bannink, Jr. ........... | B29C 73/10 244/1 A |
| 5,499,782 A | * | 3/1996 | Domine ................. | B64D 45/02 244/1 A |
| 5,865,397 A | | 2/1999 | Herrmann | |

(Continued)

FOREIGN PATENT DOCUMENTS

| | | |
|---|---|---|
| JP | 2010540345 A | 12/2010 |
| WO | WO2009046084 | 4/2009 |

OTHER PUBLICATIONS

European Patent Office; Extended European Search Report for Application No. 15156342.6 dated Aug. 20, 2015.

(Continued)

*Primary Examiner* — Jeff Aftergut
*Assistant Examiner* — Jaeyun Lee
(74) *Attorney, Agent, or Firm* — Parsons Behle & Latimer

(57) ABSTRACT

A repair apparatus for an electrically conductive layer of a composite structure includes a dielectric layer, having a perimeter, secured to the structure, and a conductive layer, secured over the dielectric layer and to the structure around an entirety of the perimeter of the dielectric layer, the conductive layer being treated along a perimeter region thereof to improve a conductive path between the conductive layer and the structure.

20 Claims, 3 Drawing Sheets

(51) Int. Cl.
    *B64F 5/00*   (2006.01)
    *B29L 31/30*  (2006.01)

(56) References Cited

U.S. PATENT DOCUMENTS

| | | | | |
|---|---|---|---|---|
| 7,277,266 | B1* | 10/2007 | Le | B64D 45/02 |
| | | | | 361/218 |
| 2006/0198980 | A1* | 9/2006 | Westerdahl | B29C 73/10 |
| | | | | 428/63 |
| 2007/0230085 | A1 | 10/2007 | Le | |
| 2008/0304539 | A1* | 12/2008 | Safai | G01N 25/72 |
| | | | | 374/5 |
| 2009/0001217 | A1 | 1/2009 | Dufresne et al. | |
| 2009/0092844 | A1 | 4/2009 | Ware et al. | |
| 2011/0186206 | A1 | 8/2011 | Ackerman et al. | |
| 2012/0145825 | A1 | 6/2012 | Granado Marcarrilla et al. | |
| 2015/0344156 | A1* | 12/2015 | Vail, III | G01R 31/008 |
| | | | | 701/32.8 |

OTHER PUBLICATIONS

Japanese Patent Office; Office Action for JP Patent Application No. 2015-041587 dated Feb. 16, 2016.
State Intellectual Property Office of PRC; Office Action issued in Chinese Patent Application No. 201510098603.4 dated Jun. 13, 2016.

* cited by examiner

REPAIR APPARATUS AND METHOD FOR COMPOSITE PANELS HAVING A CONDUCTIVE LAYER

FIELD OF THE DISCLOSURE

This application generally relates to aircraft lightning strike protection techniques and, more specifically, to a temporary repair apparatus and method for conductive foil lightning strike protection for composite aircraft skin panels.

BACKGROUND

The use of carbon fiber reinforced plastic ("CFRP") materials, otherwise known as carbon fiber composites, for structural members is increasing in commercial airplanes because of the higher strength-to-weight and stiffness-to-weight ratios afforded by carbon fiber composites as compared to traditional aluminum structures.

A lightning strike to an aircraft causes a high electric current, which can typically be of the order of 100,000 amps, to flow through the aircraft frame. In a carbon fiber composite structure, which is approximately 2000 times more resistive than aluminum, the carbon fiber plies act as very high resistance conductors and the resin between the plies acts as highly capacitive dielectric layers so that lightning striking the carbon fiber composite results in an increasing potential difference produced across the ply structure but no readily available electrically conductive path for discharging the current. The current therefore tends to concentrate at the fasteners between the skin panels and the aircraft substructure, since the fasteners are generally made of highly conductive alloys for strength. When the lightning energy is unable to dissipate at a fast enough rate, arcing, sparks and other unwanted effects can occur.

One current method for dissipating electric current that flows through a structure comprising a composite skin panel which is secured to a composite inner substructure with fasteners includes the use of conductive foil (e.g. copper foil). Specifically, the fasteners also secure an electrically conductive layer, such as a copper foil grid in the form of a plurality of strips, and optionally a fiberglass ply layer to the skin panel, such that the electrically conductive layer is considered an integral part of the skin. This design diverts an electrical current such as from a lightning strike away from the fasteners and along the surface of the wing structure away from underlying substructures.

The current solution to repairing the altered structure includes a hot bond repair that involves patching the area with a new electrically conductive layer using a film adhesive and solid conductive (e.g. copper) foil, which is installed either with a heat blanket or autoclave cure process. Although this solution is effective, it has some drawbacks. For instance, the hot bond repair requires taking the aircraft out of service, bringing it to a service center, and draining all fuel out of the fuel tanks, in order to perform the hot-bond repair. Only after fuel drainage can technicians apply the patch, and then must wait for the patch to cure, which can take an additional 4-8 hours, depending on the material. This approach is appropriate for in-factory repairs or repairs during regularly scheduled aircraft maintenance, when the aircraft is intended to be out of service, but a quicker solution is more desirable for in-service repairs in order to allow the airplane to get quickly back into service until a permanent repair can be scheduled.

There thus exists a need for an inexpensive and robust technique for temporarily repairing outer composite aircraft skins that utilize copper foil along fastener rows for lightning strike protection that have been altered by lightning strikes or in some other way, in order to maintain the desired lightning prevention system to help divert lightning currents away from substructures.

SUMMARY

In accordance with one embodiment thereof, the present disclosure provides a repair apparatus for an electrically conductive layer of a composite structure. The temporary repair patch includes a dielectric layer, having a perimeter, secured to the structure, and a conductive layer, secured over the dielectric layer and to the structure around an entirety of the perimeter of the dielectric layer, the conductive layer being treated along a perimeter region thereof to improve a conductive path between the conductive layer and the structure.

In accordance with another embodiment thereof, the present disclosure provides a method for temporarily repairing a conductive composite panel having a damaged area near a metal fastener. The method includes preparing a surface of the panel in the region of the damaged area and the fastener, affixing a dielectric material to the panel, and affixing a conductive patch to the dielectric material and the panel. The dielectric material is affixed with an adhesive, the dielectric material covering the damaged area and the fastener. The conductive patch is affixed with an adhesive, the conductive patch entirely covering the dielectric material and defining a perimeter region in contact with the panel. The perimeter region of the conductive patch is treated to increase electrical conductivity between the panel and the conductive patch.

In accordance with yet another embodiment thereof, the present disclosure provides a method for temporarily repairing a carbon fiber composite aircraft skin panel. The method includes preparing a surface of the panel in a damaged region near a fastener, affixing a dielectric material to the panel, and affixing a conductive patch to the dielectric material and the panel. The dielectric material is affixed with a pressure-sensitive adhesive, the dielectric material covering the damaged area and the fastener. The conductive patch is affixed to the dielectric material and the panel with a pressure-sensitive adhesive, the conductive patch entirely covering the dielectric material and defining a perimeter region in contact with the panel. The adhesive in the perimeter region of the conductive patch is scored to expose the conductive material in selected regions of the conductive patch prior to adhesion to the panel.

Other features, benefits and advantages of the present disclosure will become apparent from the following disclosure, when viewed in accordance with the attached drawings and appended claims.

Figure 1:
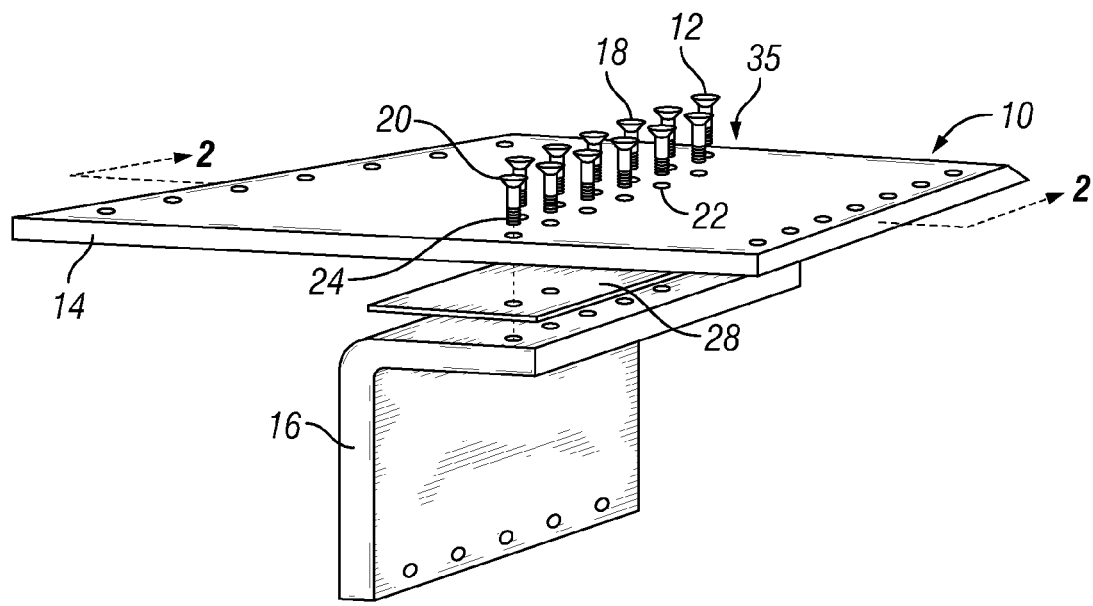
FIG. 1 is a perspective view of a portion of a pristine composite wing structure of a commercial airplane.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

A temporary repair technique for metal foil lightning strike protection of an aircraft composite structure will now be described in the context of a composite aircraft wing 10, whose structure will be described below, with respect to FIGS. 1 and 2. However, nothing in this disclosure should be construed to limit this method to an aircraft wing 10. It should be understood that the method can be applied to other structures, as one of ordinary skill in the art would recognize.

Figure 2:
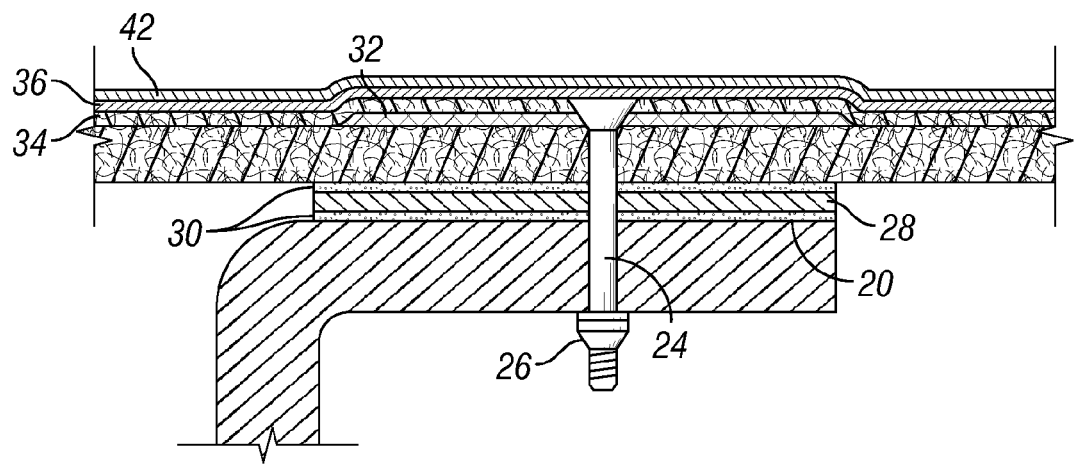
FIG. 2 is a section view of a portion of FIG. 1 taken along line 2-2.

Referring now to FIGS. 1 and 2, a section and perspective view of a portion of a wing structure 10 of an aircraft having a plurality of fasteners 12 is shown securing a skin panel 14 of an aircraft structure to an inner substructure or spar 16. This substructure 16 can be one of many parts of an aircraft, such as a spar or rib of an aircraft wing or fuselage, or the wall of a fuel tank (not shown), for example.

The skin panel 14 and the spar 16 are made of carbon fiber composite material of low weight and high strength and stiffness formed by conventional methods well known in the art. For example, while the thickness and composition can vary, in one embodiment the skin panel 14 can be formed from 34 plies of an aircraft quality, machine lay-up structural carbon fiber/epoxy tape laid in a 50/40/10 orientation and having an overall thickness of approximately 0.25 inches, while the spar 16 can include 44 plies of a hand lay-up version of aircraft quality, structural carbon fiber/epoxy tape laid in a 25/50/25 layup and having an overall thickness of about 0.32 inches. Both the skin panel 14 and spar 16 can be primed on both the tool and bag side prior to installation. Other skin panel configurations are known to those of skill in the art.

The fasteners 12 can be made of metal, such as titanium or CRES, (corrosion resistant steel), and can comprise a bolt 18 (FIG. 1), such as a Hi-Lok bolt (or e.g., a Lockbolt, Eddiebolt or Sleeved Lockbolt) with a preload shear, having a beveled head 20, which is countersunk into a correspondingly shaped opening 22 (FIG. 1) in the skin panel 14, and a shank 24, which passes through the skin panel 14 and spar 16 to be secured by a metallic nut 26 (FIG. 2) engaging the spar 16. The shank can be 0.25 inch diameter bare titanium with a 100 degree shear head, though other diameters and fastener head angles can also be used, depending on the fastener size. A sealant (not shown) can be introduced on the shank 24 prior to installation into the spar 16 and skin panel 14. A shim 28, such as an insulating shim, about 2 mils in thickness, is interposed between the skin panel 14 and the spar 16 as a filler to make up for any differences in the thickness of the skin panel 14. The shim 28 can be sealed to the panel 14 and spar 16 using a fay sealant 30.

As shown in the cross-sectional view of FIG. 2, the fastener 12 also secures an electrically conductive layer 32, such as a copper foil grid in the form of a plurality of strips (not shown), and a fiberglass ply layer 34, respectively, to the skin panel 14. The electrically conductive layer 32 is therefore considered an integral part of the skin 14. The aircraft wing structure 10 can be coated with one or more primer coats (here shown as a single layer of primer 36) over the outer surface of the skin panel 14, covering both the fiberglass ply layer 34 and the head 20 of the fastener 12, which can be substantially flush with the outer surface of the grid 32. One or more layers of paint 42 can then be applied over the entire outer surface of the primer 36.

If a metal foil grid is used as the electrically conductive layer 32, each strip of the metal foil grid 32 is dimensionally controlled and has a specified conductivity. For example, in one embodiment a metal foil that can be used is a 0.0027 inch thick, 2 ounce/ft.$^2$ copper foil such as IPC-4562/Cu-E-2-2-D-S-2 copper foil, which is manufactured by Gould Electronics, Inc. of Chandler, Ariz. The strips can each be individually centered along a respective fastener line 35 and can be about 3.6 inches wide for a single fastener 12. While not shown in the present illustrations, the strips can overlap depending upon their respective relative location along the spar 16 and skin panel 14. It is desirable that the electrically conductive layer 32 have sufficient electrical conductivity to meet or exceed IPC-4562 grade specifications to ensure a conductive path to divert much of the electric current, generated by lightning strikes, away from each respective fastener 12 along a fastener line 35.

The fiberglass ply layer 34 can be an epoxy-prepreg material formed with a Style 120 E-glass and a 250-degree or 350 degree Fahrenheit cure thermosetting epoxy resin. Alternatively, and without limitation, a wet lay-up of a similar glass weave (E-glass, Style 108) in a 250-degree Fahrenheit cure thermosetting epoxy resin can also be utilized. Other appropriate types of fiberglass or other suitable materials can be used.

The primer 36 can consist of a conventional thermosetting epoxy-based primer well known to those of ordinary skill in the art in the aerospace industry. The primer 36 is applied in one or more coats to a dry film thickness of between about 0.5 and 0.9 mils. The primer 36 can be air dried for about 4 hours prior to applications of the overlying paint layers 42. Other appropriate types of primers can be used.

The paint layer, or layers 42, can be formed from a conventional, aerospace grade polyurethane enamel that is also well known to those of ordinary skill in the art in the aerospace industry. This polyurethane enamel can be applied as a single layer of approximately 2 mil. (±0.1 mil.) dry thickness over the previously dried primer 36. If more than about 48 hours has passed since application of the primer 36, it can be required to reactivate the surface of the primer 36 by applying a solvent such as isopropyl alcohol or other appropriate solvent prior to applying the paint 42. The paint 42 can be air dried for between about 4 hours and 7 days to ensure complete curing.

After a lightning strike, or due to some other type of contact or skin-damaging event, the electrically conductive layer 32 and/or one or more of the fasteners 12 can be structurally altered such that a conductive path cannot be established to divert electrical current away from the fasteners 12 and along the surface of the wing structure 10 away from the underlying substructures, such as fuel tanks. As noted above, methods for repairing and reworking damaged skin areas on an aircraft of composite construction have been developed. However, the current solution for repairing a damaged or altered structure involves patching the damaged area with a new electrically conductive layer using a hot bond film adhesive and solid copper foil, which is installed either with a heat blanket or autoclave cure process. Although this solution is effective, and is appropriate for in-factory repairs, it is too time-consuming for in-service repairs, which need a quick solution to allow the aircraft to get quickly back into service until a permanent repair can be scheduled. Specifically, the hot bond repair requires taking the aircraft out of service, bringing it to a service center, draining fuel out of the tank(s), applying the patch, and then waiting for the patch to cure which can take an additional 4-8 hours depending on the material.

Advantageously, a temporary repair method for an electrically conductive layer of a composite aircraft skin has been developed that can be performed in-service (i.e., without taking the aircraft out of service). An embodiment of this repair method is illustrated in FIGS. 3 and 4, and described in the logic flow diagram of FIG. 5.

Figure 3:
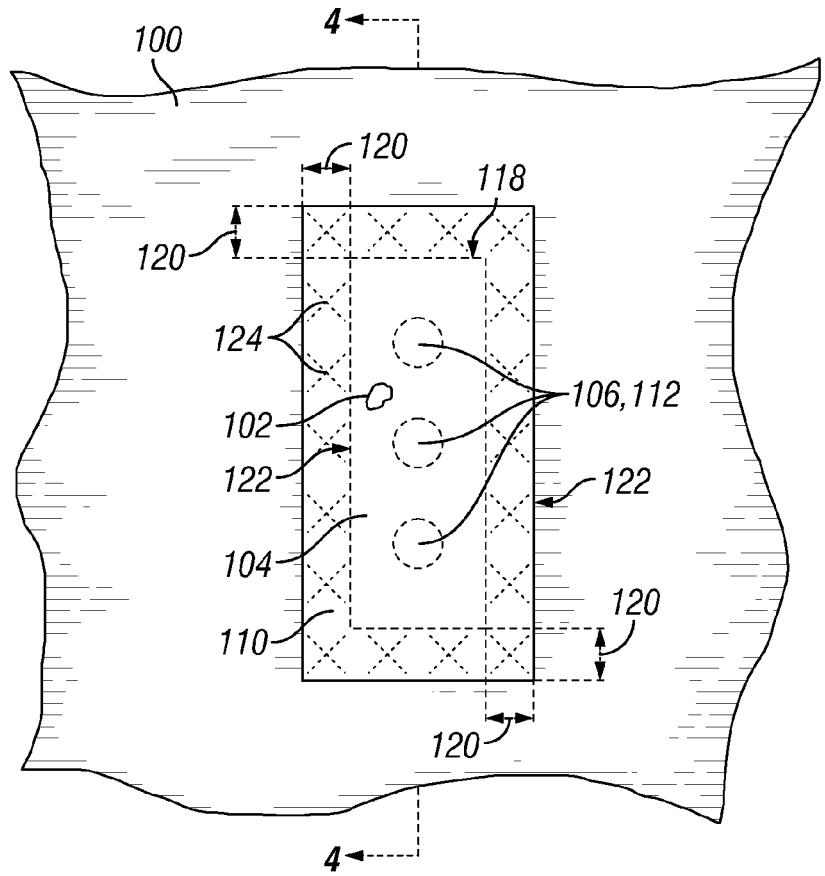
FIG. 3 is a plan view of a portion of a composite panel that has been repaired in accordance with the method disclosed herein.
Figure 4:
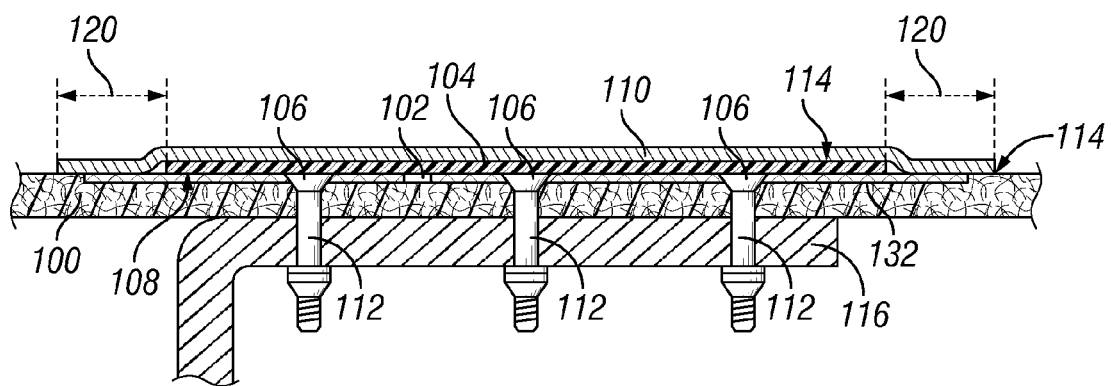
FIG. 4 is a section view of the repair location of FIG. 3.

Shown in FIGS. 3 and 4 is a portion of an aircraft composite skin panel 100 that has been repaired in accordance with the method disclosed herein. Though the details of the composite skin and its various layers are not shown in the views of FIGS. 3 and 4, the composition of this composite skin is intended to be substantially the same as shown in FIG. 2. It is also to be noted that the thickness of some of the layers are greatly exaggerated in FIG. 4 for illustrative purposes. The composite skin panel 100, also referred to as the "parent panel," is illustrated as having a damaged area 102 in FIG. 3, the damaged area being in the vicinity of a group of metal fasteners 112, which fasten the panel to an underlying support structure, such as a spar 116. This damage 102 is of the type that has or may be believed by maintenance personnel to have damaged a conductive layer 132 that is incorporated into the composite skin 100 in the vicinity of the fasteners 112. The damage can be a small area of impact damage, lightning strike damage, or any other type of minor damage that has damaged or may have damaged the conductive layer 132.

Advantageously, this damaged area 102 can be temporarily repaired in accordance with the method disclosed herein. In accordance with this method, the damaged area 102 is ground smooth with a mechanical grinder, if needed, to restore the profile of the skin. This step can be desirable where the damage is minor impact damage, for example, that has caused an indentation and/or raised burr or the like on the surface of the skin 100.

The skin surface can be sanded to prepare for adhesive application and to facilitate the conductive layer 110 being electrically grounded to the parent panel 100, which can include exposing the conductive layer 132, depending on the configuration of the panel 100. Sanding can also be performed to restore the aerodynamic shape of the skin in the region of the damaged area 102.

Once the skin panel 100 has the desired profile surrounding the damaged area 102, a sheet 104 of dielectric material is cut to a size and shape that is sufficient to cover all of the fasteners 112 and the damaged area 102. Various dielectric materials can be used. In one embodiment, a 2-8 mil sheet of polyester has been used, and proven to be suitable. In general, it is desirable that the dielectric film have specific dielectric breakdown properties. A material having a dielectric constant of about 2 to 5 is considered suitable. Other materials and thicknesses can also be used. The purpose of the dielectric material 104 is to insulate the heads 106 of the fasteners 112, so that electrical energy from any subsequent lightning strike is directed away from the fasteners 112. This dielectric material 104 is applied to the skin 100 with a pressure sensitive adhesive 108, such as an acrylic or silicone adhesive, in a manner such that the dielectric sheet 104 covers the heads 106 of the fasteners 112 and the damaged area 102.

A conductive layer 110 (e.g., copper foil) is then cut to a size that is larger than the dielectric layer 104, so that it can be applied atop the dielectric layer 104 as a patch. The conductive layer 110 is of a controlled thickness. This thickness can vary. It has been found that a metal foil material having the equivalent conductivity of 8-12 mil aluminum is suitable. Various materials, such as copper, aluminum or other metal foil, and other thicknesses having comparable conductivity can also be used. The conductive patch 110 is applied over the dielectric layer 104 using a pressure sensitive adhesive layer 114, such as an acrylic or silicone adhesive.

The patch of conductive material 108 extends beyond the perimeter 118 of the dielectric material 104 on all sides, providing a perimeter region 120. Extending the conductive patch 110 beyond the perimeter 118 of the dielectric material 104 on all sides helps prevent possible electrical arcing in the event of a lightning strike, which could otherwise occur. If the conductive layer 110 were not continuous around the perimeter 118 of the dielectric layer (or if the perimeter region 120 is too narrow), electrical arcing could puncture the patch 110 to the head 106 of a fastener 112, or an electrical arc could jump from the edge of the conductive layer 110 to the parent panel 100. As another example, if the conductive strip 110 were only in contact with the parent panel 100 along two parallel side edges 122 of the dielectric material 104, this would not allow effective current diversion from the conducive strip 110 to the parent panel 100, and may not prevent electric arcing from the conductive strip 110 to the fastener heads 106. Such a configuration may not protect the fasteners 112 because it would not provide a conduction path at the end of the conductive strips 110 to parent panel 100.

In order to improve electrical contact between the conductive layer 110 and the parent panel 100, the portion of the adhesive layer 114 in the perimeter region 120 can be provided with scores or grooves, indicated by lines 124 in FIG. 3. Scoring of the adhesive 114 in this area removes a small amount of the adhesive (which tends to act as a dielectric) so that the metal conductive layer 110 is more directly in contact with the parent panel 100 around the perimeter 118 of the dielectric layer 104. As noted above, the fiberglass ply layer (34 in FIG. 2) is sanded sufficiently to allow the conductive layer 110 to be electrically grounded to the parent panel 100. This allows effective current diversion from the conductive strip 110 to the parent panel 100, thus preventing attachment or arcing to the heads 106 of the fasteners 112. The width of the perimeter region 120 can vary, and can depend upon the overall size and shape of the patch 110. It is believed that a perimeter region 120 having a width of from 0.5 inch to 1.0 inch can be suitable.

After the conductive layer 110 has been applied, the repair edge is then sealed with resin or aerosealer, and the patch can be painted if desired. As noted above, the thicknesses of the dielectric layer 104 and conductive patch 110 are greatly exaggerated in FIG. 4 for illustrative purposes. In actual practice, the dielectric layer 104 and conductive layer 110 together will have a thickness of from 12-20 mils, with the adhesive layers 108 and 114 adding perhaps another 3-5 mils of thickness. The total patch will thus have a thickness that is less than 25 mils, such that this repair will have minimal impact on the aerodynamic characteristics of the region of the aircraft on which it is applied, and will be only minimally visible. It is generally desirable that the total patched area be as small as possible. The overall size of the conductive patch 108 for a repair of this type is usually not larger than about 1 foot by 1 foot, though it is conceivable that larger areas can be patched using this method.

Figure 5:
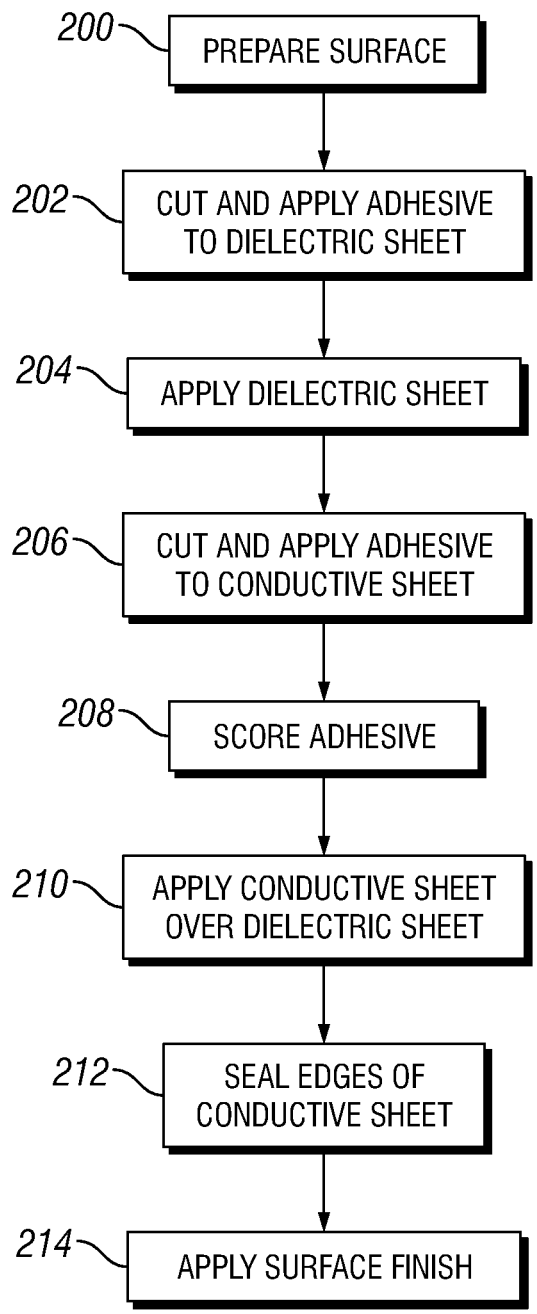
FIG. 5 is a logic flow diagram for repairing a wing structure in accordance with the present disclosure.

The steps in an embodiment of the temporary repair technique disclosed herein are outlined in the logic flow diagram of FIG. 5. As discussed above, the composite surface is first prepared (block 200), which can include filling, grinding, chemical cleaning, etc. A sheet of dielectric material is then cut to an appropriate size and shape to cover the damaged area and the nearby fasteners and provided with a suitable pressure-sensitive adhesive (block 202), and then affixed to the composite panel (block 204) so that this dielectric material is securely adhered to the composite panel over the fasteners. An adhesive may be cut and applied to the dielectric sheet (block 202) prior to affixing the dielectric sheet to the panel (block 204). A sheet or patch of conductive material is then cut to an appropriate size and shape, and provided with pressure-sensitive adhesive (block 206). An adhesive may be cut and applied to the conductive sheet (block 206) prior to affixing the conductive sheet to the dielectric sheet (block 210). The shape and size of the conductive material are selected to entirely cover the sheet of dielectric material, and also provide a perimeter region of the conductive material that can directly contact the composite panel entirely around the perimeter of the dielectric material. The adhesive on the conductive material is scored or otherwise treated (block 208) to provide areas of the perimeter region in which closer or more complete electrical contact is allowed between the conductive sheet and the composite panel. Scoring of the adhesive is one method of treating the conductive material to improve electrical contact. Other mechanical or chemical methods can also be used.

The conductive sheet is applied over the dielectric material (block 210) in a manner that the central region of the conductive sheet is securely adhered to the dielectric material, and the perimeter region of the conductive sheet is securely adhered directly to the composite panel. The edges of the conductive material can then be sealed (block 212) and the entire temporary repair region can be finished, such as with primer, paint, etc.

The controlled thickness and dielectric strength of the dielectric layer 104, combined with the controlled thickness and conductivity of the conductive layer 110 thus produce a temporary patch for a damaged region of carbon fiber skin panel 100 in the vicinity of metal fasteners 112 that substantially restores the electrical current distributive properties of the skin panel 100, thus protecting this region of the aircraft from excessive damage in the event of a future lightning strike. Advantageously, this temporary repair method is very robust, and is believe to be durable from 3 months up to 2 years, so that the aircraft can remain in service until a routinely-scheduled maintenance period, at which time the skin panel can be permanently fixed using a more time-consuming method. Thus, the aircraft does not necessarily have to be grounded after a lightning strike or other skin-damaging event, saving both time and money.

The repair consists of a combination of a controlled thickness and conductivity film applied over a controlled thickness dielectric film with specific dielectric breakdown properties. The contact between the conductive film and the parent panel conductive material is by intermittent contact through the pressure sensitive adhesive provided by periodically scoring the adhesive around the perimeter of the film. The conductive film is required to be continuous around the perimeter of the dielectric film or it punctures to the fastener head.

Although various embodiments have been shown and described, the present disclosure is not so limited and will be understood to include all such modifications and variations are would be apparent to one skilled in the art.

What is claimed is:

1. A method for temporarily repairing a conductive composite panel having a damaged area near a metal fastener, comprising:
    preparing a surface of the panel in the region of the damaged area and the fastener;
    affixing a dielectric material to the panel with an adhesive, the dielectric material covering the damaged area and the fastener; providing an adhesive on a conductive patch; scoring the adhesive along a perimeter region of the adhesive on the conductive patch;
    affixing the conductive patch to the dielectric material and the panel with the adhesive, the conductive patch entirely covering the dielectric material and defining a perimeter region in contact with the panel; and
    wherein scoring the adhesive increases an electrical conductivity between the panel and the conductive patch.

2. A method in accordance with claim 1, wherein preparing the surface of the panel comprises grinding the surface of the panel to expose a conductive layer of the panel.

3. A method in accordance with claim 1, wherein preparing the surface of the panel comprises roughening the surface of the panel.

4. A method in accordance with claim 1, wherein preparing the surface of the panel comprises grinding and/or filling the damaged area to substantially restore a profile of the surface of the panel.

5. A method in accordance with claim 1, wherein preparing the surface of the panel comprises removing one or more layers of paint and/or primer from the surface.

6. A method in accordance with claim 1, further comprising sealing perimeter edges of the conductive patch after affixing the patch to the panel.

7. A method in accordance with claim 1, wherein affixing the dielectric material to the panel comprises affixing a dielectric material having a thickness of 2-8 mils and a dielectric constant of about 2 to 5.

8. A method in accordance with claim 1, wherein affixing the conductive patch comprises affixing a conductive patch having a thickness of from 8-12 mils and an equivalent conductivity of aluminum having a thickness of from 8-12 mils.

9. A method for temporarily repairing a carbon fiber composite aircraft skin panel, comprising:
    preparing a surface of the panel in a damaged region near a fastener;
    affixing a dielectric material to the panel with a pressure-sensitive adhesive, the dielectric material covering the damaged area and the fastener; and
    affixing a conductive patch to the dielectric material and the panel with a pressure-sensitive adhesive, the conductive patch entirely covering the dielectric material and defining a perimeter region in contact with the panel, wherein adhesive in the perimeter region of the conductive patch is scored to expose the conductive material in selected regions of the conductive patch prior to adhesion to the panel.

10. A method in accordance with claim 9, wherein preparing the surface of the panel comprises one or more of grinding, sanding, filling and chemically treating the panel surface prior to affixing the dielectric material.

11. A method in accordance with claim 9, wherein affixing the dielectric material to the panel comprises affixing a dielectric material having a thickness of 2-8 mils and a dielectric constant of about 2 to 5, and affixing the conductive patch comprises affixing a conductive patch having a thickness of from 8-12 mils and an equivalent conductivity of aluminum having a thickness of from 8-12 mils.

12. A method in accordance with claim 9, further comprising sealing outer perimeter edges of the conductive patch after affixing the patch to the panel.

13. A method in accordance with claim 9, wherein the aircraft skin panel is one of a fuselage skin panel and a wing skin panel.

14. A method for temporarily repairing a conductive composite panel having a damaged area near a head of a metal fastener extending through the composite panel, comprising:
preparing a surface of the panel near the damaged area and the head of the fastener;
affixing a dielectric material to the panel with an adhesive, the dielectric material covering the damaged area and the head of the fastener; providing an adhesive on a conductive patch; scoring the adhesive along a perimeter region of the adhesive on the conductive patch;
affixing the conductive patch to the dielectric material and the panel with the adhesive, the conductive patch entirely covering the dielectric material and defining a perimeter region in contact with the panel; and
wherein scoring the adhesive increases an electrical conductivity between the panel and the conductive patch.

15. A method in accordance with claim 14, wherein preparing the surface of the panel comprises one or more of grinding, sanding, filling and chemically treating the panel surface prior to affixing the dielectric material.

16. A method in accordance with claim 14, wherein affixing the dielectric material to the panel comprises affixing a dielectric material having a thickness of 2-8 mils and a dielectric constant of about 2 to 5, and affixing the conductive patch comprises affixing a conductive patch having a thickness of from 8-12 mils and an equivalent conductivity of aluminum having a thickness of from 8-12 mils.

17. A method in accordance with claim 14, further comprising sealing outer perimeter edges of the conductive patch after affixing the patch to the panel.

18. A method in accordance with claim 14, further comprising sealing perimeter edges of the conductive patch after affixing the patch to the panel.

19. The method of claim 10, further comprising cutting the adhesive and applying the adhesive to the dielectric material prior to affixing the dielectric material to the panel.

20. The method of claim 19, further comprising cutting the adhesive and applying the adhesive to the conductive patch prior to affixing the conductive patch to the dielectric material and the panel.

* * * * *